United States Patent
Gieseler et al.

[11] Patent Number: 6,102,378
[45] Date of Patent: Aug. 15, 2000

[54] SPRING DEVICE

[75] Inventors: Eckhard Gieseler, Freudenberg; Dirk Lambrecht, Hamburg, both of Germany

[73] Assignee: Phoenix Aktiengesellschaft, Hamburg, Germany

[21] Appl. No.: 09/091,037

[22] PCT Filed: Dec. 10, 1996

[86] PCT No.: PCT/DE96/02360

§ 371 Date: Jun. 5, 1998

§ 102(e) Date: Jun. 5, 1998

[87] PCT Pub. No.: WO97/21576

PCT Pub. Date: Jun. 19, 1997

[30] Foreign Application Priority Data

Dec. 12, 1995 [DE] Germany .............. 195 46 315

[51] Int. Cl.$^7$ .................................. B60G 11/56
[52] U.S. Cl. .............. 267/34; 267/64.24; 267/190; 105/453
[58] Field of Search .............. 267/34, 186, 64.24, 267/221, 201, 203, 190, 222; 105/199.1, 453

[56] References Cited

U.S. PATENT DOCUMENTS

| | | | |
|---|---|---|---|
| 2,180,492 | 11/1939 | Wilson et al. | 105/208.1 |
| 2,815,201 | 12/1957 | Girod-Eymery | 267/9 |
| 2,989,301 | 6/1961 | Johannsen | 267/34 |
| 3,239,236 | 3/1966 | Flowers | 280/104.5 |
| 3,285,617 | 11/1966 | Jackson | 280/6 |
| 3,580,557 | 5/1971 | Dean | 267/3 |
| 3,599,955 | 8/1971 | Yew | 267/34 |
| 3,603,610 | 9/1971 | Thompson | 280/124 F |
| 3,904,181 | 9/1975 | Harsy-Vadas | 267/35 |
| 3,941,061 | 3/1976 | Schindehutte et al. | 105/135 |
| 4,029,021 | 6/1977 | Paul | 105/199 |
| 4,368,672 | 1/1983 | Germer | 105/199 |
| 4,428,302 | 1/1984 | Herring, Jr. | 105/197 |
| 4,474,267 | 10/1984 | Empson | 188/33 |
| 4,665,835 | 5/1987 | Mohacsi et al. | 105/199.2 |
| 4,690,388 | 9/1987 | Harrison | 267/35 |
| 4,974,872 | 12/1990 | Riese | 280/693 |
| 5,595,371 | 1/1997 | Hukuda et al. | 267/34 |

FOREIGN PATENT DOCUMENTS

| | | |
|---|---|---|
| 812 045 | 4/1937 | France . |
| 1 576 829 | 8/1969 | France . |
| 1 190 811 | 4/1965 | Germany . |
| 1 605 051 | 12/1970 | Germany . |
| 2 060 960 | 6/1972 | Germany . |
| 2 440 069 | 3/1976 | Germany . |
| 3 412 547 | 10/1985 | Germany . |
| 4 404 878 | 3/1995 | Germany . |
| 4-29631 | 1/1992 | Japan . |

*Primary Examiner*—Robert J. Oberleitner
*Assistant Examiner*—Bradley King
*Attorney, Agent, or Firm*—Collard & Roe, P.C.

[57] ABSTRACT

A spring device arrangement in particular for the area of railway vehicles, in particular for spring suspension between a bogie and coach body, in which a spring device is located between a supporting plate and a substructure includes two spring systems connected in parallel. Each spring system comprises three parallel springs, the spring being an air spring or hydropneumatic spring comprising a bellows of elastomer material which connects the supporting plate to the upper part of a spring-support piston, the springs of the spring system being interconnected in a pressure-equalizing manner by an overflow duct. The spring is disposed outside the spring and extends from the supporting plate to the substructure, and the spring is installed in the support piston of the spring, a force-transmitting pressure piston simultaneously being used. The lower part of the pressure piston rests on the spring and its upper part, which is provided with an end stop, projects into the interior of the spring, the pressure piston having inside the region of contact with the support piston a vertical slide surface and a stepped stop which produces pretension in conjunction with the spring.

13 Claims, 1 Drawing Sheet

SPRING DEVICE

BACKGROUND OF THE INVENTION

1. Field OF the Invention

The invention relates to a spring device particularly in the sector of rail-borne vehicles, and there especially for spring suspension between a bogie and a coach body. The spring device is arranged between a supporting plate and a substructure and consists of two spring systems I and II connected in parallel. Each spring system comprises three springs arranged parallel to each other, namely a first spring A, a second spring B and a third spring C. Such a spring device is known from DE 34 12 547.

2. The Prior Art

In order to assure safety against derailment with a spring device according to DE 34 12 547 as well as with other known spring devices (DE-B-11 90 811; DE-B-20 60 960; DE-B-24 40 069; DE-C-44 04 878; FR-A-812 045; JP-A-4/29631) also in emergency operations, costly additional bogie constructions were required in the coach body heretofore in most cases, or a larger installation space is needed for the spring device. The greatest problems arise in this connection of a relatively long and torsion-resistant coach body tube has to be taken into account, and proof of safety against detailing has to be furnished for emergency operations.

Now, based on said state of the art the problem of the invention is to improve the safety against derailment in emergency operations while avoiding complicated and cost-intensive coach body constructions, i.e., to improve such safety in the twisting platform in the event of failure of the spring devices known until now.

SUMMARY OF THE INVENTION

This problem is solved by a spring device according to the characteristics of patent claim 1, i.e. by using springs A, B and C described below in more detail.

First spring A

Spring A is an air or hydropneumatic spring comprising a bellows made of elastomeric material (i.e., rubber or rubber-like plastic), which, with securing means, connects the supporting plate with the upper part of a roll-off piston.

Springs A of the two parallel connected spring systems I and II are connected with each other in a pressure-equalizing manner by means of an overflow duct, whereby the overflow duct extends in particular within the supporting plate and is connected with a valve, which is arranged between the two spring systems.

The supporting plate is advantageously provided within spring A with a stop with an integrated inlet opening.

Second spring B

Spring B, which in particular has the form of a spiral spring made of steel or elastomeric material, is arranged outside of spring A and extends from the supporting plate up to the substructure.

Third spring C

Spring C also has in particular the form of a spiral spring made of steel or elastomeric material and is installed within the roll-off piston of spring A, using at the same time a pressure piston for transmitting force, said pressure piston resting with its lower part on spring C particularly in connection with a flange-like widening, and projecting with its upper part, the latter being provided with a face-like stop, into the interior of spring A, whereby the pressure piston has a vertical slide surface within the area of contact with the roll-off piston, as well as a step-like stop, which in conjunction with spring C produces pretension.

The face-like stop of the pressure piston is advantageously designed in the form of a plate particularly in connection with a plastic layer. Said stop is mounted directly opposite the supporting plate.

The substructure of the spring device is usefully equipped with additional springs particularly in the form of elastomer springs or metal/elastomer-layered springs, whereby the substructure advantageously consists of a top plate and a bottom plate, with the springs being arranged between said plates.

The two parallel connected spring systems I and II are fully arranged with the same height.

BRIEF DESCRIPTION OF THE DRAWING

The invention is now explained with the help of an exemplified embodiment and by reference to a schematic drawing depicting an embodiment of the spring device arrangement according to the invention.

DETAILED DESCRIPTION OF PREFERRED EMBODIMENTS

Figure 1:
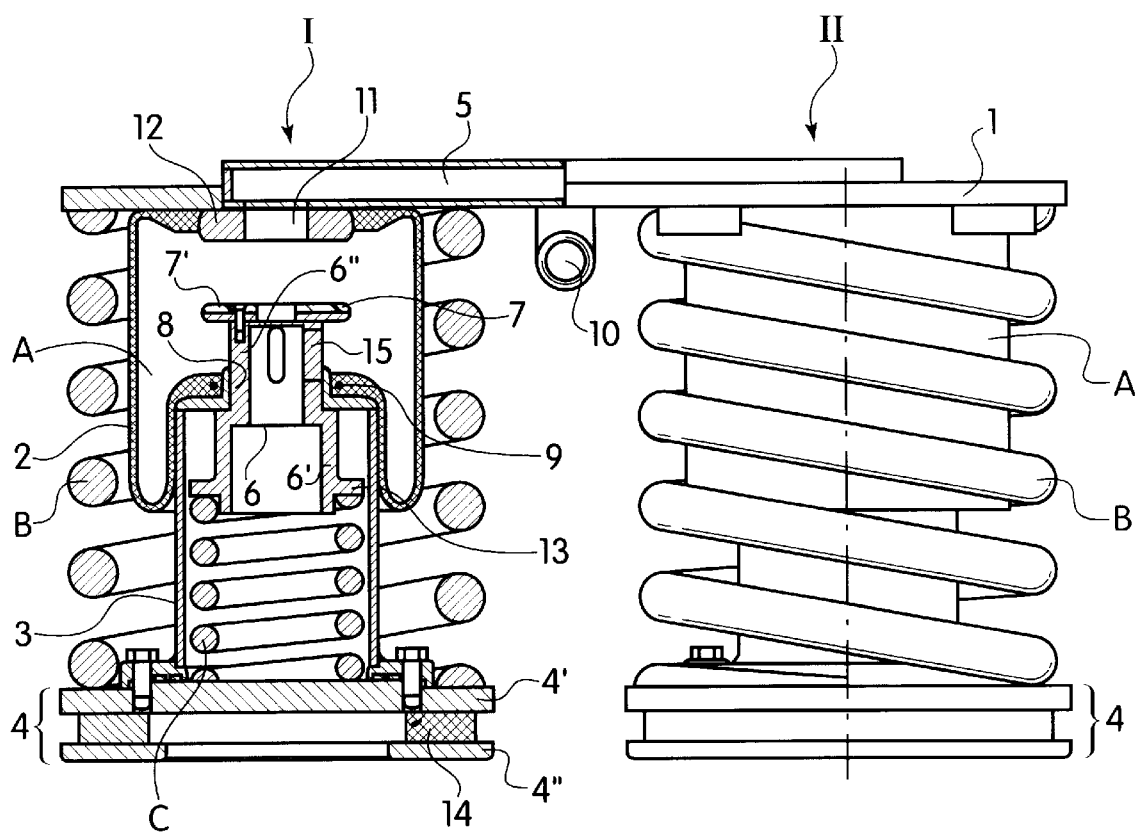

The two spring systems I and II, which are connected in parallel and have the same height and which are disposed below supporting plate 1, each consist of a spring A and a spring B, said springs being arranged parallel with each other as well. Spring A is an air spring or a hydropneumatic spring comprising a bellows made of elastomeric material, and a roll-off piston 3, whereas spring B is a spiral spring made of steel or elastomeric material, whereby spring A is located within spring B. An overflow duct 5 with a valve 10 connects the two springs A in a pressure-equalizing manner, whereby the overflow duct extends within supporting plate 1.

Now, spring A serves for automatically controlling the height of the floor of a vehicle and keeps such height constant under all load conditions. Spring B is load/travel-dependent. The difference in load between the empty and the loaded vehicle is absorbed only by spring A in the normal case, with the share in load of spring B remaining the same under any load conditions.

Depending on the design of springs A and B it is possible that the immersion frequency between empty and full loads remains constant to the highest possible degree.

Now, if spring A is defective (e.g. due to loss of pressure), spring B will assume the emergency operation propoerties. With empty loads, spring B Lakes over the share in load of spring A.

Furthermore, spring systems I and II are equipped with an additional spring C, which is connected parallel with springs A and B as well and uses at the same time a pressure piston 6 for transmitting force. The lower part 6' of the pressure piston is provided with a flange-like widening 13, which rests on spring C. The upper part 6" of the pressure piston is provided with a face-like stop 7, which is designed in the form of a plate and equipped with an additional plastic layer 7', and which projects into the interior of spring A. Stop 7 of pressure piston 6 is arranged directly opposite stop 12 of supporting plate 1, whereby stop 12 is provided with an integrated inlet opening 11. Furthermore, pressure piston 6 has a vertical slide surface 8 within the area of contact with roll-off piston 3, as well as a step-like stop 9, which produces pretension in conjunction with spring C.

Now, in the event of failure of spring A (emergency operation), spring C supports spring B especially under full-load conditions and provides for a progressive spring characteristic. Spring C is not active under normal operating conditions (when spring A is intact), disregarding exceptional cases.

Substructure 4 is advantageously equipped with additional springs 14, for example in the form of rubber springs or metal-and-rubber layered springs. Here the substructure consists of a top plate 4' and a bottom plate 4", with springs 14 being arranged between said plates.

If an air spring is used, it is advantageous, furthermore, if at least one passage opening 15 is present within the upper part 6" of pressure piston 6 particularly in the lateral zone of the latter, such passage opening connecting the interior of spring A with the interior of roll-off piston 3.

What is claimed is:

1. A spring device arrangement comprising a supporting plate, a substructure and a spring device located between the supporting plate and the substructure, said spring device consisting of two spring systems connected in parallel, each spring system in turn comprising three springs arranged parallel to each other, namely a first spring, a second spring and a third spring, characterized in that the first spring is an air spring comprising a bellows made of elastomeric material and connecting the supporting plate with the upper part of a roll-off piston by utilizing securing means, the first springs of the spring systems being connected with each other in a pressure-compensating manner by means of an overflow duct;

the second spring is mounted outside the first spring and extends from the supporting plate to the substructure; and the third spring is installed within the roll-off piston of the first spring, simultaneously using a pressure piston for transmitting force, said pressure piston resting with its lower part on the third spring and projecting with its upper part, which is provided with an end stop, into the interior of the first spring, the pressure piston having inside the region of contact with the roll-off piston a vertical slide surface as well as a stepped stop which produces a pretension in conjunction with the third spring, the upper part of the pressure piston having at least one passage opening connecting the interior of the first spring with the interior of the roll-off piston, and said substructure comprises a top plate and a bottom plate and is equipped with additional springs arrangement between said top and bottom plates.

2. The spring device arrangement according to claim 1, characterized in that the overflow duct (5) extends within the supporting plate (1).

3. The spring device arrangement according to claim 1, characterized in that the overflow duct (5) is connected with a valve (10), the latter being arranged between the two spring systems (I, II).

4. The spring device arrangement according to claim 1, characterized in that the first spring has an inlet opening arranged directly above the pressure piston in the axial direction of said pressure piston.

5. The spring device arrangement according to claim 1, characterized in that the end stop of the pressure piston is designed in the form of a plate.

6. The spring device arrangement according to claim 1, characterized in that the end stop of the pressure piston is provided with a plastic layer.

7. The spring device arrangement according to claim 1, characterized in that the supporting plate is provided within first spring with a stop, said stop being arranged directly opposite the end stop of the pressure piston.

8. The spring device arrangement according to claim 1, characterized in that the lower part of the pressure piston widens to form a flange, said flange resting on the third spring.

9. The spring device arrangement according to claim 1, characterized in that the second and third springs are steel spiral springs or elastomer springs.

10. The spring device arrangement according to claim 1, characterized in that the parallel connected ring systems (I, II) are arranged with the same height.

11. The spring device arrangement according to claim 1, wherein the spring device is located between a bogie and a coach body in a rail-borne vehicle.

12. The spring device arrangement according to claim 1 wherein said additional springs are elastomeric springs or metal elastomeric layer springs.

13. The spring device arrangement according to claim 1 wherein said passage opening is present in a lateral zone of the pressure piston.

\* \* \* \* \*

UNITED STATES PATENT AND TRADEMARK OFFICE
CERTIFICATE OF CORRECTION

PATENT NO. : 6,102,378
DATED : August 15, 2000
INVENTOR(S) : GIESELER ET AL

It is certified that error appears in the above-identified patent and that said Letters Patent is hereby corrected as shown below:

In column 4, line 33 (line 2 of claim 10), change "ring" to --spring--.

Signed and Sealed this

Seventeenth Day of April, 2001

Attest:

NICHOLAS P. GODICI

*Attesting Officer*      *Acting Director of the United States Patent and Trademark Office*